(12) United States Patent
Kincaid et al.

(10) Patent No.: US 7,059,338 B1
(45) Date of Patent: Jun. 13, 2006

(54) EMERGENCY SHUTOFF VALVE (75) Inventors: Thomas R. Kincaid, Mission Viejo, CA (US); James S. Shivers, Costa Mesa, CA (US); Frederick A. Mosher, Costa Mesa, CA (US)

(73) Assignee: Halogen Valve Systems, Inc., Irvine, CA (US)

( * ) Notice: Subject to any disclaimer, the term of this patent is extended or adjusted under 35 U.S.C. 154(b) by 450 days.

(21) Appl. No.: 10/400,327

(22) Filed: Mar. 26, 2003

Related U.S. Application Data

(60) Provisional application No. 60/367,943, filed on Mar. 26, 2002.

(51) Int. Cl.
*F16K 17/38* (2006.01)

(52) U.S. Cl. .................. 137/14; 137/78.5; 137/552; 251/129.11; 251/292

(58) Field of Classification Search ............... 137/78.5, 137/552, 14; 251/129.111, 292
See application file for complete search history.

(56) References Cited

U.S. PATENT DOCUMENTS

| RE32,885 | E | 3/1989 | Graham |
| 4,973,107 | A | 11/1990 | Graham |
| 5,092,745 | A | 3/1992 | Graham |
| 5,154,491 | A | 10/1992 | Graham |
| 5,255,961 | A | 10/1993 | Graham |
| 5,361,877 | A | 11/1994 | Graham |
| 5,393,130 | A | 2/1995 | Graham |
| 5,588,637 | A | 12/1996 | Carsten et al. |
| 6,267,455 | B1 | 7/2001 | Graham |

*Primary Examiner*—A. Michael Chambers
(74) *Attorney, Agent, or Firm*—Knobbe, Martens, Olson & Bear LLP (57) ABSTRACT

A valve control system comprises a programmable electronic controller. The programmable electronic controller is configured to provide an emergency actuation signal to a motor upon receiving an emergency close signal. The programmable electronic controller is configured to provide a test actuation signal to the motor upon receiving a test close signal. The valve control system further comprises a gas detection input configured to receive a gas detection signal. Receipt of the gas detection signal at least partially meeting a first criterion causes the emergency close signal to be supplied to the controller. The valve control system further comprises a user interface configured to provide the controller with the test close signal in response to a user input. The valve control system further comprises a low battery input configured to receive a low battery signal. Receipt of the low battery signal causes the emergency close signal to be supplied to the controller.

30 Claims, 7 Drawing Sheets

EMERGENCY SHUTOFF VALVE

PRIORITY APPLICATION

This application claims priority under 35 U.S.C. § 119(e) from U.S. Provisional Patent Application Ser. No. 60/367,943, entitled "Emergency Valve Closing Apparatus" and filed Mar. 26, 2002. The entire disclosure of this priority document is hereby incorporated by reference in its entirety.

FIELD OF THE INVENTION

The present invention relates generally to the field of valve actuation devices, and relates specifically to an electronically controlled valve actuation system.

BACKGROUND OF THE INVENTION

Hazardous or toxic chemicals, such as chlorine, sulfur dioxide and ammonia, are widely distributed in pressurized containers for use in water purification, sewage treatment, and a variety of other industrial and agricultural applications. Many of these chemicals are immediately toxic to humans, even in low concentrations. Accordingly, it is commonplace for the containers, valves, fittings and dispensing procedures for these chemicals to be strictly regulated by governmental regulatory bodies.

In accordance with such regulations, an operator who is properly equipped, trained, and certified usually connects and disconnects the pressurized storage containers used to store and dispense such chemicals. The containers are, however, routinely left unattended for extended periods of time while connected to process piping during filling and dispensing. Indeed, the chemicals in these containers are typically employed in applications requiring low dosage rates (for example, in ratios of the chemical to the treated fluid measured in a few parts per million). Thus, it may take days, weeks, or even months for the contents of such containers to be completely discharged. Consequently, it is generally impracticable for such containers to be continuously monitored by a live attendant during their use cycle.

In addition, if there is any leakage at the pressurized storage container, or at any other point in the facility where such toxic chemicals are used, the toxicity of the chemicals involved will often preclude the approach of an operator or technician without protective breathing apparatus and protective clothing.

For example, one conventional automatic valve actuation system for closing the filling/dispensing valve of a pressurized storage container includes a rotary valve actuator that can be controlled by a motor or that can be controlled manually. However, once a particular mode of operation, either manual or automatic, is selected by the operator, the alternative mode is effectively disabled. Disadvantageously, should the manual mode be selected and the system left unattended, emergency shutoff in the automatic mode would not be possible.

Another conventional automatic valve activation system, often used with bulk containers, employs a compressed air-driven valve actuator. Such systems generally are not suitable for use with application container valves. In addition, compressed air typically requires dehumidification and filtering to avoid freezing, corrosion, and particulate contamination, all of which can damage the system or cause it to malfunction. Such systems typically also require some mechanism for converting electrical signals to pneumatic signals, and vice-versa. Accordingly, compressed air systems are typically quite complex, bulky, and expensive.

SUMMARY OF THE INVENTION

In accordance with the foregoing, in one embodiment an automatic or remote valve actuation system is provided that can be powered by an "uninterruptable" power supply (for example, a backup or reserve battery) that can be easily replenished from a readily available source, such as a municipal 110 volt alternating current source, thus eliminating the need for a compressed air source. Optionally, the system is portable, and can easily be configured for use with both bulk containers and application containers. The system can be used with both liquid and gas valves on pressurized storage containers. In one embodiment, such a system can be used with a plurality of leak detection sensors which can be placed throughout the facility where toxic chemicals are used, thus providing for emergency shutoff even in the case of a leak remote to the pressurized storage container. Optionally, the system permits manual operation of the valves as well. Advantageously, embodiment of the system can be economically manufactured and can be installed and used without significant training.

In one embodiment of the present invention, a valve control system comprises a programmable electronic controller. The programmable electronic controller is configured to provide an emergency actuation signal to a motor upon receiving an emergency close signal. The programmable electronic controller is configured to provide a test actuation signal to the motor upon receiving a test close signal. The valve control system further comprises a gas detection input configured to receive a gas detection signal. Receipt of the gas detection signal at least partially meeting a first criterion causes the emergency close signal to be supplied to the controller. The valve control system further comprises a user interface configured to provide the controller with the test close signal in response to a user input. The valve control system further comprises a low battery input configured to receive a low battery signal. Receipt of the low battery signal causes the emergency close signal to be supplied to the controller.

In another embodiment of the present invention, a method comprises providing a programmable electronic controller configured to apply a predetermined power to a motor upon receiving a valve close signal. The method further comprises providing an impact torqueing device configured to translate a rotation produced by the motor into rotation of a pressurized gas storage container valve stem. The method further comprises mounting the impact torqueing device to a first portion of the valve stem, such that a second portion of the valve stem is accessible to a user for manual operation. The method further comprises providing a user interface capable of sending valve close signals to the programmable electric controller. The method further comprises positioning a gas detector in a region of gas use, the gas detector configured to send a valve close signal to the programmable electric controller upon detection of a gas.

In another embodiment of the present invention, a method of closing a pressurized storage tank valve comprises providing a valve close signal to a controller in response to at least one of the following: (a) detection of a gas at a gas detection sensor; (b) receipt of a test close command provided at a user interface; (c) detection of a low battery condition in a power supply. The method further comprises applying an actuation signal to a motor for a predetermined time upon receiving a valve close signal at the controller, thereby causing the pressurized storage tank valve to close.

In another embodiment of the present invention, a valve control system comprises an impact torqueing device attached to a valve stem coupler. The valve stem coupler is configured to be removably attached to a valve stem of a pressurized storage container. The valve control system further comprises a motor configured to provide a driving torque to the impact torqueing device. The impact torqueing device transmits the driving torque to the valve stem of the pressurized storage container, thereby moving the valve stem from an open position to a seated position. The valve control system further comprises a programmable electronic controller configured to provide an actuation signal to the motor upon receiving a close signal from an external source. The motor applies the driving torque to the impact torqueing device upon receipt of the actuation signal. The valve control system further comprises a power supply configured to provide electrical power to the motor and the programmable electronic controller.

BRIEF DESCRIPTION OF THE DRAWINGS

The drawings, which are briefly described below, are intended to be illustrative and not limiting. Certain drawings include exemplary operating parameters; as explained in the detailed description below, such parameters are provided to illustrate one mode of operation, and other operating parameters can be used. The drawings comprise the following figures.

DETAILED DESCRIPTION OF PREFERRED EMBODIMENTS

The various components comprising an exemplary embodiment of an emergency valve closing system 100 are described herein. As will be described in greater detail below, the valve closing system 100 can be used to automatically or manually close valves, such as multi-turn self seating valves, such as are often found on pressurized storage containers. The valve closing system can be used with both gas and liquid valves. In one embodiment, a processor based solid state electronic controller receives valve closing commands from either a user interface or from external sensors, and then closes one or more attached valves to a predetermined torque. The processor can comprise a processor, a microcontroller, or another suitable solid state electronic controller. In other embodiments, other control devices, such as a state machine, can be used in place of, or in addition to, the microprocessor.

Hardware Overview

Figure 1A:
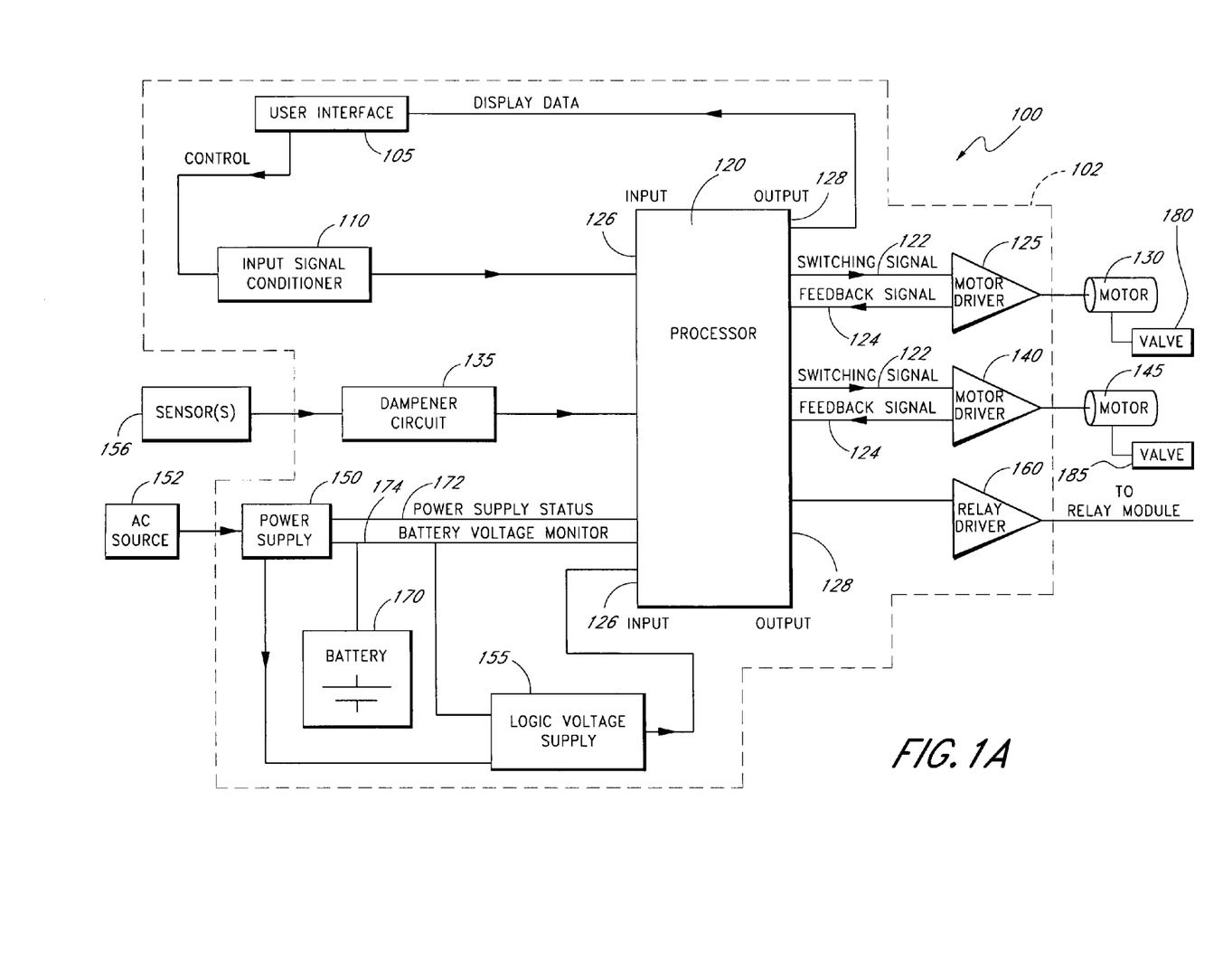
FIG. 1A is a schematic diagram of hardware that comprises an exemplary embodiment of an emergency valve closing system.

FIG. 1A illustrates an exemplary embodiment of an emergency valve closing system 100. The valve closing system 100 comprises electronic circuitry, discussed in further detail below, encased within an environmentally isolating enclosure 102 having a NEMA 4x rating, with cable ports or fittings being maintained substantially airtight by suitable fittings that likewise have a NEMA 4x rating. The enclosure 102 advantageously includes a transparent window (not shown) for viewing one or more illuminating indicators that will be described in greater detail below.

The valve closing system 100 comprises a processor 120 configured to provide command and control functions for the closing system 100. In an exemplary embodiment, the processor 120 comprises a micro-controller with an internal analog to digital converter and four channel analog multiplexer. The processor 120 optionally includes random access memory ("RAM") and nonvolatile memory, such as programmable read only memory ("PROM") and electrically erasable programmable read only memory ("EEPROM"), as well as an input port expander 126 and an output port expander 128. Other embodiments of the processor 120 can further comprise any number of other devices to provide the desired input and output functions along with a processor capable of executing a sequence of predetermined commands. The nonvolatile memory stores software or firmware, including instructions used to perform portions of the processes described herein.

In such embodiments, the processor 120 is configured to receive an electrical actuation signal generated by one or more external sensors 156. One type of sensor 156 that can be used is a commercially available gas sensor that generates an actuation signal automatically in response to the detection of a specified gas in concentrations greater than a predetermined threshold level. In addition or alternately, the sensor 156 can be of the type that generates an actuation signal in response to the presence of flame, smoke, or heat, or seismic vibrations. Further, one or more of the external sensors can optionally comprise remote station alarms or manual switches, thereby allowing a user to generate an actuation signal from a remote location.

In one embodiment, the actuation signal generated by a sensor 156 is sensed by the processor 120 as a change from a fixed, non-zero potential across the sensor (for example, 5 volts) to a closed circuit (zero potential) condition, although other actuation signals can also be used. In exemplary embodiments, therefore, the actuation signal comprises a pulse of predetermined magnitude and of at least a predetermined duration. A signal that does not meet these predetermined criteria is considered a "transient" signal, and is detected and suppressed by a transient dampener circuit 135, such as a bounce detection and suppression circuit. In an exemplary embodiment, the dampened circuit 135 comprises optical isolators, although any other type of device that provides electrical isolation could also be used.

Upon receipt of an actuation signal, the processor 120 generates a switching signal 122 which is sent to one ore more motor drivers. In the exemplary embodiment illustrated in FIG. 1A, the closing system 100 comprises two motor drivers 125, 140, but in other embodiments, more or fewer motor drivers can be used. The motor drivers 125, 140 are configured to convert the switching signal 122 from the processor 120 to voltage and current levels that cause a motor 130, 145 to controllably close a valve 180, 185..

Figure 1B:
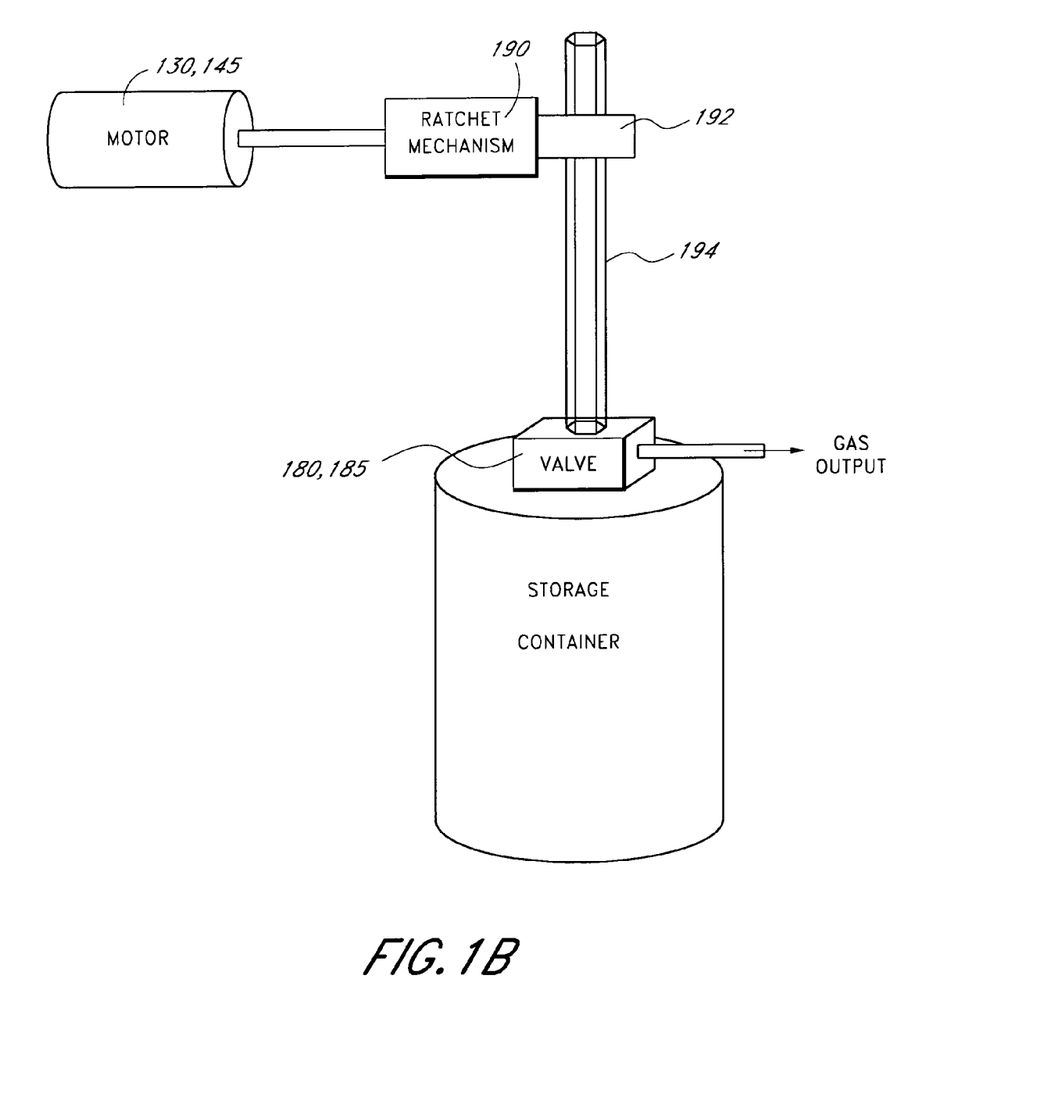
FIG. 1B is a block diagram illustrating use of an impact wrench to close a pressurized storage container valve.

In an exemplary embodiment, illustrated in the block diagram of FIG. 1B, an electromechanical device combines a direct current motor 130, 145 with a ratchet mechanism 190. An example of such a device is an impact wrench. The ratchet mechanism 190 has an output shaft 192 that is advantageously connected to a coupler that mounts onto a multi-turn self seating flow control valve stem 194. In an exemplary embodiment, the coupler is configured to mount to a standard ⅜ inch valve stem, although in other embodiments the coupler can be modified to mount to other valve stem sizes. Such a configuration allows the motors 130, 145 to continue to rotate as the flow control valve stem 194 stops rotating and begins to seat. As the valve stem stops rotating, the ratchet mechanism 190 coverts the motor velocity and torque to a force used to seat and tighten the flow control valve stem 194. The total amount of torque applied to the flow control valve stem can be controlled by using the processor 120 to deliver a predetermined amount of electrical energy to the motors 130, 145 for a predetermined duration. The predetermined amount of electrical energy is determined by applying a predetermined voltage to the motors 130, 145 for a predetermined time. Such voltage and time parameters determine the angular velocity at which the motors 130, 145 will rotate, and in turn will determine the amount of torque that will be applied to the valve stem. For example, in one embodiment, between approximately 20 to 50 foot pounds of torque is delivered to the valve stem during a closing operation.

Referring again to FIG. 1A, in certain embodiments, the motor drivers 125, 140 further comprise noise suppression electronic circuitry, such as electronic filters, configured to reduce the amount of electrical noise produced by the motors 130, 145, thereby reducing interference with the processor 120. In still other embodiments, the motor drivers 125, 140 further comprise electronic circuitry to provide analog current measurements and digital over current feedback signals 124 to the processor 120. In particular, provision of a digital over current feedback signal allows the processor 120 to stop driving the motor drivers 125, 140 if a short circuit conditions exists in one of the motor drivers 125, 140.

Still referring to the exemplary embodiment illustrated in FIG. 1A, power for the valve closing system 100 is provided by a power supply 150, which is electrically connected to an external alternating current ("AC") source 152, such as a 110 volt public utility line. When the external AC source 152 is available, the power supply 150 provides electrical power to a logic voltage supply 155, which provides the processor 120 with a source of direct current ("DC") power.

As illustrated in FIG. 1A, the power supply 150 can also be configured to monitor a rechargeable battery 170, and to apply an appropriate charge current to the battery 170 as needed to maintain the battery 170 in a charged state. For example, in one embodiment, the battery 170 comprises a sealed gel cell lead acid battery rated at 12 volts and 7 ampere hours. The battery 170 can provide power to the logic voltage supply 155 in the event that the power supply 150 is disconnected from the AC source 152. The battery 170 can also provide large currents that may be required for operation of the motors 130, 145.

The battery 170 can be charged using a battery charger circuit incorporated into the power supply 150. Use of such a battery charger circuit advantageously extends battery life, reduces energy usage and protects the power supply 150 in the event of a battery failure. Such a battery charger circuit can be configured to provide a "trickle charge" to the battery 170, thereby maintaining the battery 170 in a fully charged state. In certain embodiments, the battery charger can be temperature compensated to improve battery performance and service life. However, an ordinarily skilled artisan will recognize that other battery changing systems can be used in other embodiments.

As described above, the logic voltage supply 155 provides DC power to the processor 120 and associated system electronics. The logic voltage supply 155 can be configured to automatically select its source power from the power supply 150 or from the battery 170. In an exemplary embodiment, if the output voltage of the logic voltage supply 155 varies by more than an allotted range, the processor 120 can be programmed to stop executing firmware commands until the output of the logic voltage supply 155 returns to a value that is within the allotted range.

In an exemplary embodiment, the closing system 100 further comprises AC monitoring circuitry 172 configured to allow the processor 120 to monitor the power supply 150 to detect a failure of the external AC source 152. The closing system 100 can further comprise battery monitoring circuitry 174 configured to allow the processor 120 to monitor a voltage generated by the battery 170. The monitoring circuitry 172, 174 can compare the monitored voltage to a preset value stored in the processor 120; if a low voltage is detected, the processor 120 can provide such information to a user via indicators on a user interface, which is described in greater detail below. If desired, the processor 120 can also be programmed to actuate the motors 130, 145 in the event a low voltage condition is detected by the monitoring circuitry 172, 174. Such a configuration advantageously allows the valves to be closed while the battery 170 still contains sufficient energy to close the valves completely or satisfactorily.

The exemplary embodiment illustrated in FIG. 1A further comprises a relay driver 160. The relay driver 160 is configured to convert low level signals from the processor 120 to voltage and current levels necessary to control a remote relay or any other device. For example, the processor 120 can be configured to provide power to the relay driver 160 only in the event of an emergency valve close operation, which can be advantageous if a remote siren or alarm is connected to the relay driver 160. In other embodiments, continuous power can be supplied to the relay driver 160. In a modified embodiment, the relay driver 160 further comprises additional circuitry, such as electronic filters, adapted to reduce any electrical noise introduced by electromechanical devices (such as the motors 130, 145) or by long signal lines.

Advantageously, one embodiment of the closing system 100 further includes a user interface 105 that allows the user to control certain operations of the valve closing system and to monitor the operational status of the closing system 100. For example, the user interface can comprise one or more indicators, which can be used to display the status of the battery 170 (for example, fully charged or low charge) or the status of the motors 130, 145 (for example, running or not running) based on control signals received from the processor 120. In one embodiment, the indicators can comprise light emitting diodes ("LEDs"), which are advantageous because of their low operating power requirements and their superb visibility in enclosed areas. However, other types of indicators can be used. As described above, the enclosure 102 can comprise a transparent window (not shown) to allow the indicators to be visible to the user.

The user interface 105 can also include control switches allowing the user to provide input to the processor 120. Examples of such control switches, In an exemplary embodiment, conventional membrane momentary control switches are used, although other switch technologies, such as a touch-screen, can also be used. Switches can be provided to allow the user to perform a "test close" on the motor drivers 125, 140, thereby providing a method for determining whether the closing system 100 is functioning properly.

For example, in one embodiment, a separate test switch is provided for each of the motor drivers connected to the processor 120.

As shown in the exemplary embodiment illustrated in FIG. 1A, control signals from the user interface 105 are passed through an input signal conditioner 110 before reaching the processor 120. The input signal conditioner 110 is configured to filter electrical noise or other stray electrical signals or voltage transients from the control signals received from the user interface 105.

Firmware Overview

FIGS. 2 through 6 illustrate an exemplary operating routine that can be used to control the emergency valve closing system 100 described above. Specifically, the processor 120 can be programmed to follow this operating routine, which causes the valve closing system to close one or more multi-turn self seating pressurized storage container valves upon receipt of an actuation signal. The system described herein is configured for use with two such storage containers, the first of which is referred to as the "A" container, and the second of which is referred to as the "B" container. However, an ordinarily skilled artisan will recognize that such a system can easily be adapted for use with any number of such storage containers. Actuation signals can be generated as a result of a variety of events; in the exemplary embodiment described herein, the actuation signals are generated by a remote electrical contact state change, a low battery condition, or a user-initiated command.

As will be described in greater detail below, the closing system 100 can be programmed to close the valve or valves differently depending on the type of actuation signal the processor 120 receives. For example, if the processor 120 receives an actuation signal generated by a remote electrical contact state change, an "emergency valve close" will be performed. In an emergency valve close, a preprogrammed electrical signal is sent to each motor sequentially, and each motor rotates the flow control valve stem at a high velocity until it seats and is tightened to a specified torque. In contrast, if the processor 120 receives an actuation signal generated by the user at the user interface 105, a "test valve close" will be performed. In a test valve close, each motor rotates the flow control valve stem at a low velocity until it seats and is tightened to a specified torque. To provide yet another example, if the processor 120 receives an actuation signal generated in response to the detection of a low battery condition, an emergency valve close will be performed.

Figure 5:
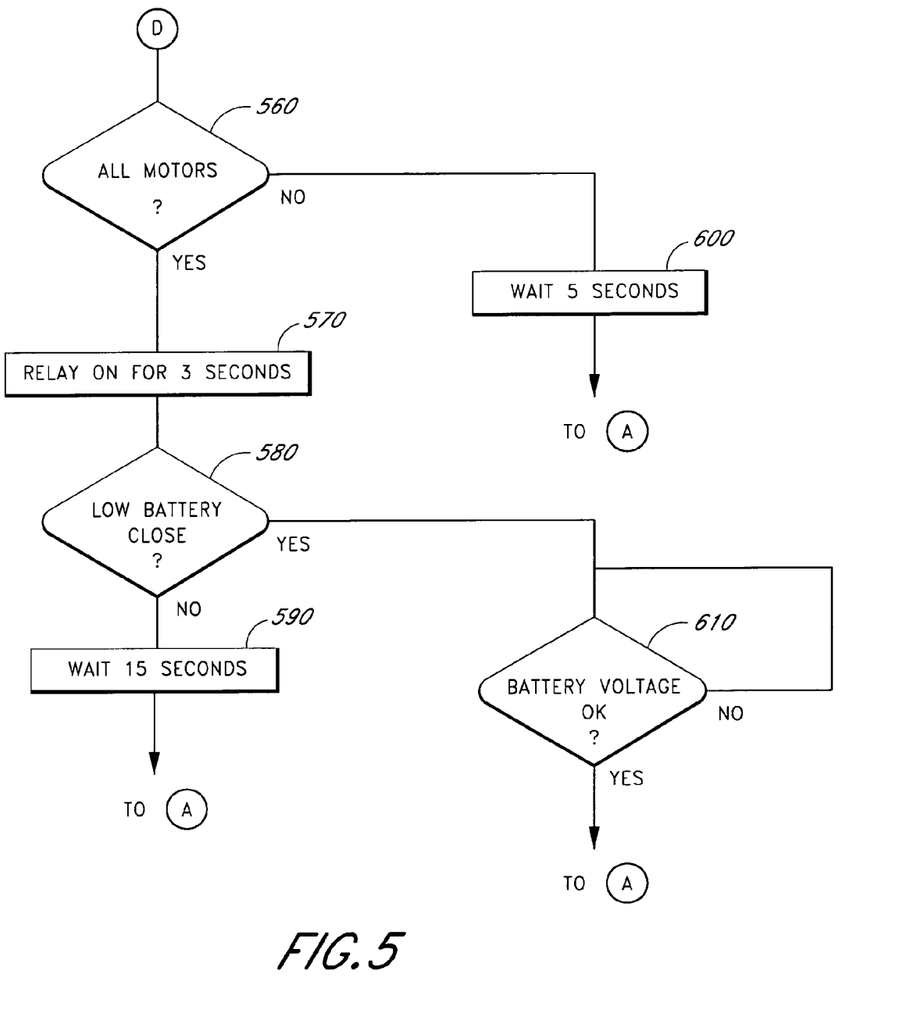
Figure 6:
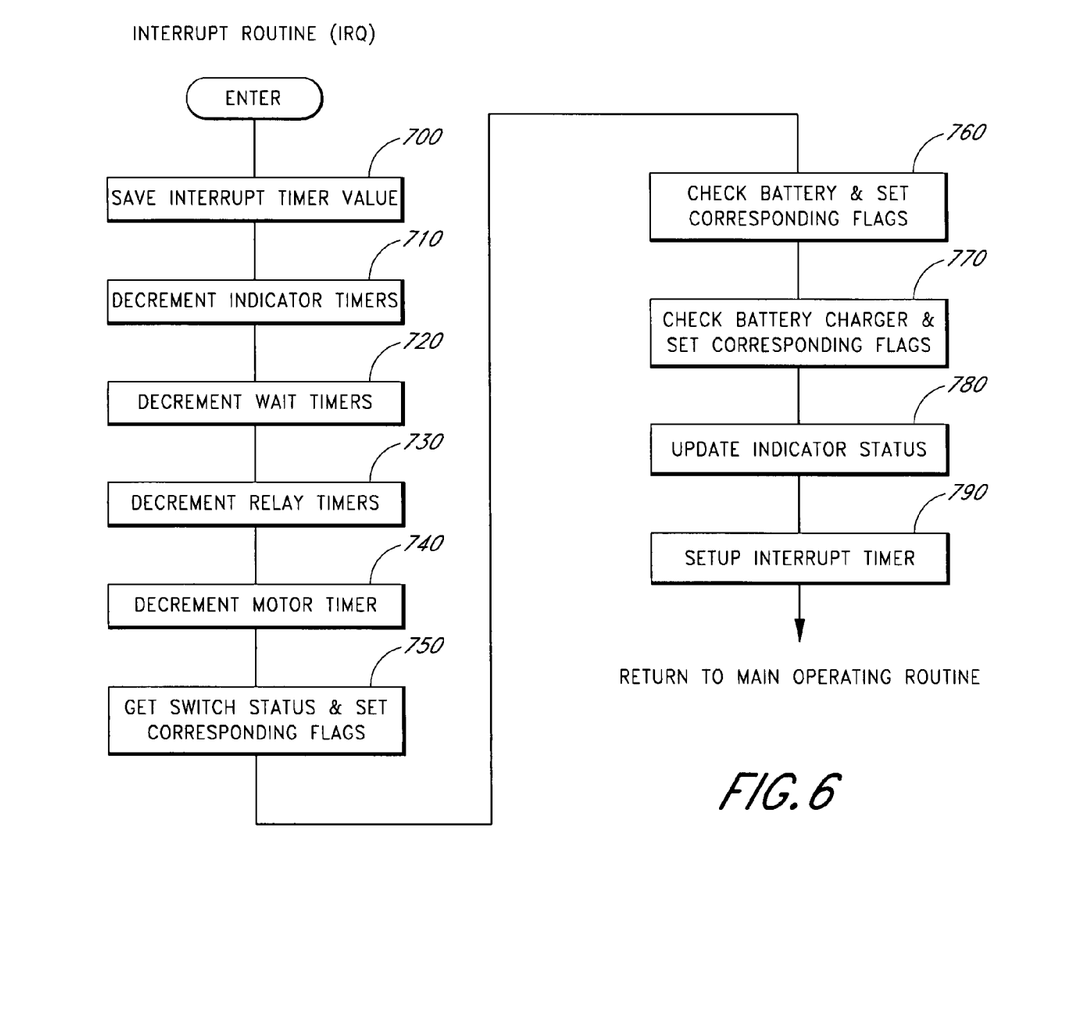
FIG. 6 is a flowchart illustrating an exemplary interrupt operating routine used to control the emergency valve closing system illustrated in FIG. 1A.

The exemplary operating routines described herein can be classified into a main operating routine (illustrated in the flowcharts of FIGS. 2 through 5 and comprising operational blocks 200 through 610) and an interrupt operating routine (illustrated in the flowchart of FIG. 6 and comprising operational blocks 700 through 790). The main operating routine monitors receipt of actuation signals and controls the motor drivers in response to such actuation signals. The interrupt operating routine runs at a specified time interval (for example, every 10 milliseconds in one embodiment) and decrements timers, updates indicators on the user interface 105, and monitors the status of the battery 170 and power supply 150. In an exemplary embodiment, the interrupt routine executes in a fraction of the minimum time allotted to increase the interrupt repetition rate.

Main operating routine. The main operating routine is illustrated in the flowcharts of FIGS. 2 through 5 and comprises operational blocks 200 through 610. In an exemplary embodiment, the main operating routine monitors receipt of actuation signals and controls motor drivers in response to such actuation signals. Such an exemplary embodiment is described in greater detail as follows.

Figure 2:
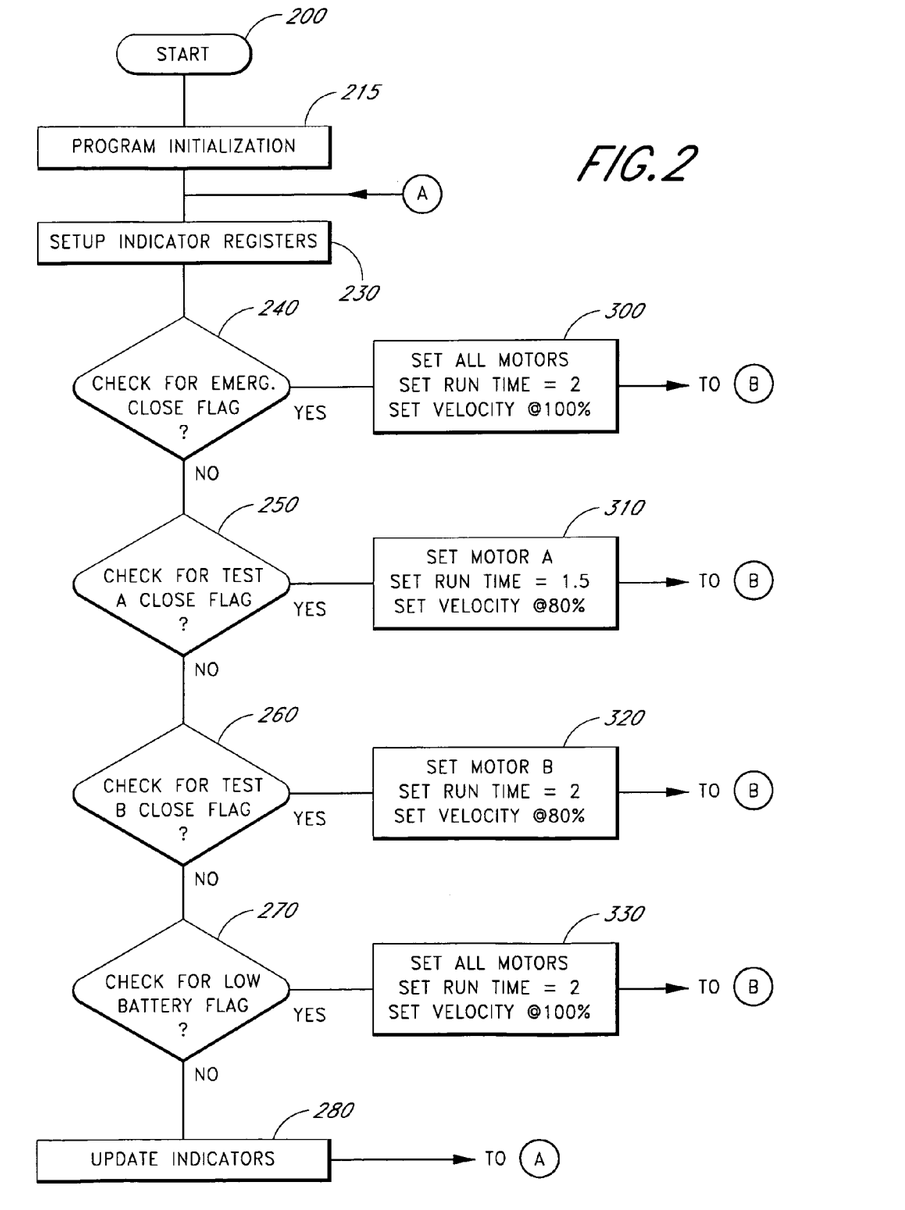
FIGS. 2 through 5 comprise a flowchart illustrating an exemplary main operating routine used to control the emergency valve closing system illustrated in FIG. 1A.

The main operating routine starts at operational block 200, such as for example when power is initially supplied to the processor 120. In certain embodiments, the valve closing system 100 includes a reset button which, when touched, causes the operation process of the processor 120 to return to starting operational block 200. In still other embodiments, the processor 120 can be programmed to return to starting operational block 200 when a computer operating properly ("COP") hardware register overflows, such as may be caused by an irregular voltage supply or other electromagnetic interference.

Once the processor 120 has begun operations, a program initialization procedure is performed in operational block 215. At this operational block, routine program initialization functions are performed, such as resetting the COP hardware register, clearing internal command registers, and displaying firmware version identification on the user interface 105. In other embodiments, still other initialization functions can be performed. In addition, internal processor timers can be initialized and preset in this operational block 215; such internal processor timers are used, for example, to activate the interrupt operating routine (described in greater detail below) at a predetermined frequency.

Once the program initialization procedure is complete, indicator registers are also initialized in an operational block 230. In an exemplary embodiment, the user interface 105 includes an "Armed/Ready" indicator that flashes when the closing system 100 is armed and ready to respond to an actuation signal. To accomplish this flashing indicator configuration, an Armed/Ready indicator timer is polled in operational block 230. If the Armed/Ready indicator timer is zero, an Armed/Ready indicator register is changed (from on to off or vice-versa) and the timer is reset to a new value (equal to the desired indicator flashing interval). If the timer is non-zero, then the Armed/Ready indicator register is not altered and no further action is taken. The Armed/Ready indicator timer is reduced during the interrupt operating routine, which is described in greater detail below.

In other embodiments, the user interface 105 can include a battery status indicator and/or a power supply status indicator. For example, the battery status indicator can indicate to the user whether the battery 170 is fully charged (indicator on), partially charged (indicator flashing) or discharged (indicator off). Likewise, the power supply status indicator can indicate to the user whether the battery is charging in a fast charge mode (indicator flashing rapidly), is charging in a slow charge mode (indicator flashing slowly), is being held in a maintain change mode (indicator on), or is not present (indicator off). Other such indicators can be updated in the operational block 230 in a similar fashion to the Armed/Ready indicator register described above.

Once the indicator registers are initialized, the processor 120 checks for the presence of an emergency close flag in decisional block 240. When the processor 120 receives an actuation signal generated by a remote electrical contact state change, the interrupt operating routine sets an emergency close flag. For example, in one embodiment, the emergency close flag is set as a logical "on" condition stored in the processor memory, indicating that an event has occurred, such as receipt of an actuation signal. If an emergency close flag is detected in decisional block 240, operation proceeds to operational block 300, where a motor flag is set to "all", a run time register is set to an increased time (for example, 2 seconds), and a velocity register is set to 100%. In such case, operation then proceeds to operational point B, described below in connection with FIG. 3.

If an emergency close flag is not detected as being set, the processor 120 checks for the presence of a test valve A close flag in decisional block 250. When the user, using the user interface 105, generates a container A test actuation signal, the interrupt operating routine sets a test valve A close flag. If a test valve A close flag is detected in decisional block 250, operation proceeds to operational block 310, where a motor flag is set to "A", a run time register is set to a reduced time (for example, 1.5 seconds), and a velocity register is set to 80%. In such case, operation then proceeds to operational point B, described below in connection with FIG. 3.

If neither an emergency close flag nor a test valve A close flag are detected as being set, the processor 120 checks for the presence of a test valve B close flag in decisional block 260. When the user, using the user interface 105, generates a container B test actuation signal, the interrupt operating routine sets a test valve B close flag. If a test valve B close flag is detected in decisional block 260, operation proceeds to operational block 320, where a motor flag is set to "B", a run time register is set to a reduced time (for example, 1.5 seconds), and a velocity register is set to 80%. In such case, operation then proceeds to operational point B, described below in connection with FIG. 3.

If neither an emergency close flag nor a test valve close flag are detected at being set, the processor 120 checks for the presence of a low battery flag in decisional flock 270. When the battery monitoring circuitry 174 (discussed in greater detail above) detects that the battery 170 is holding a charge less than a threshold charge quantity, a low battery actuation signal is generated and supplied to the processor 120, and the interrupt operating routine sets a low battery flag. If a low battery flag is detected in decisional block 270, operation proceeds to operational block 330, where a motor flag is set to "all", a run time register is set to an increased time (for example, 2 seconds), and a velocity register is set to 100%. In such case, operation then proceeds to operational point B, described below in connection with FIG. 3.

If none of the emergency close flag, the test valve close flags, and the low battery close flag are detected at being set, indicators on the user interface 105 are updated as appropriate in operational block 280. For example, in embodiments comprising a battery status indicator or a power supply status indicator, if a low battery charge condition or a battery charge failure condition are detected (for example, during the interrupt operating routine) an appropriate flag will be set. The detection of such a flag in operational block 280 will cause an appropriate indicator to be activated on the user interface 105. An ordinarily skilled artisan will recognize that while this configured advantageously provides the user with information about the operation of the valve closing system, the use of such system status indicators is not necessary for the operation of the valve closing system.

After any indicators on the user interface 105 are updated, operation of the processor 120 returns to operational block 230, as described above, and as illustrated in FIG. 2.

Figure 3:
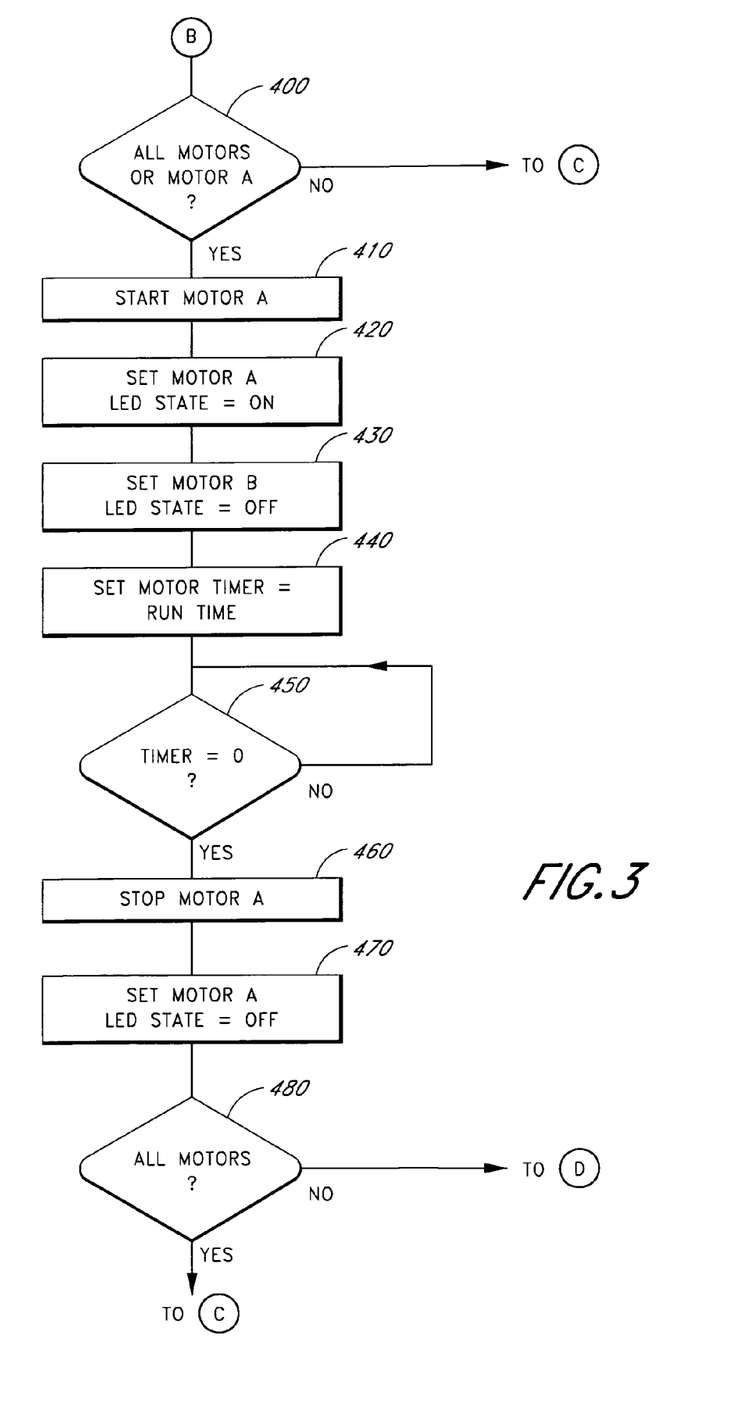

If any of the emergency close flag, the test valve A close flag, the test valve B close flag, or the low battery close flag are detected as being set in operational blocks 240, 250, 260 and 270, respectively, operation of the processor 120 will proceed to operational point B, illustrated in FIG. 3. Referring now to FIG. 3, the motor flag is polled in decisional block 400. If the motor flag is set to "all" or "A", operation proceeds to operational block 410; if the motor flag is set to "B", operation proceeds to operational point C, illustrated in FIG. 4.

Referring still to FIG. 3, in operational block 410 the processor 120 sends a signal to a first motor driver 125 causing a first motor 130, corresponding to the "A" container, to actuate. In an exemplary embodiment, the first motor 130 actuates using the velocity parameter previously stored in the velocity register (see, for example, operational blocks 300, 310, 320, 330 in FIG. 2). In embodiments wherein the user interface 105 comprises a motor status indicator to indicate operation of the first motor 130, such indicator is activated in operational block 420, and a corresponding motor status indicator for a second motor 145, corresponding to the "B" container, is deactivated in operational block 430. Such a configuration advantageously provides the user with information relating to the status of the motors comprising the valve closing system 100.

After the motor status indicators are set appropriately, operation proceeds to operational block 440, wherein a motor timer is set to the value previously stored in a run time register (see, for example, operational blocks 300, 310, 320, 330 in FIG. 2). The first motor 130 is then allowed to run for such a predetermined period of time in decisional block 450. For example, if the motor timer contains a non-zero value, then the motor timer is polled again; if the motor timer equals zero, then operation proceeds to operational block 460. The motor timer is reduced by the interrupt operating routine, as described below. Such a configuration causes the first motor 130 to run for the predetermined time period.

After the first motor 130 has run for the predetermined time interval, in operational block 460 the processor 120 sends a signal to the first motor driver 125 causing the first motor 130 to stop operation. As described above, in embodiments wherein the user interface 105 comprises a motor status indicator to indicate operation of the first motor 130, such indicator is deactivated in operational block 470.

Referring still to FIG. 3, operation of the processor 120 will then proceed to decisional block 480, where the motor flag is polled. If the motor flag is set to "all", operation proceeds to operational point C, illustrated in FIG. 4; if the motor flag is not set to "all", operation instead proceeds to operational point D, illustrated in FIG. 5.

Figure 4:
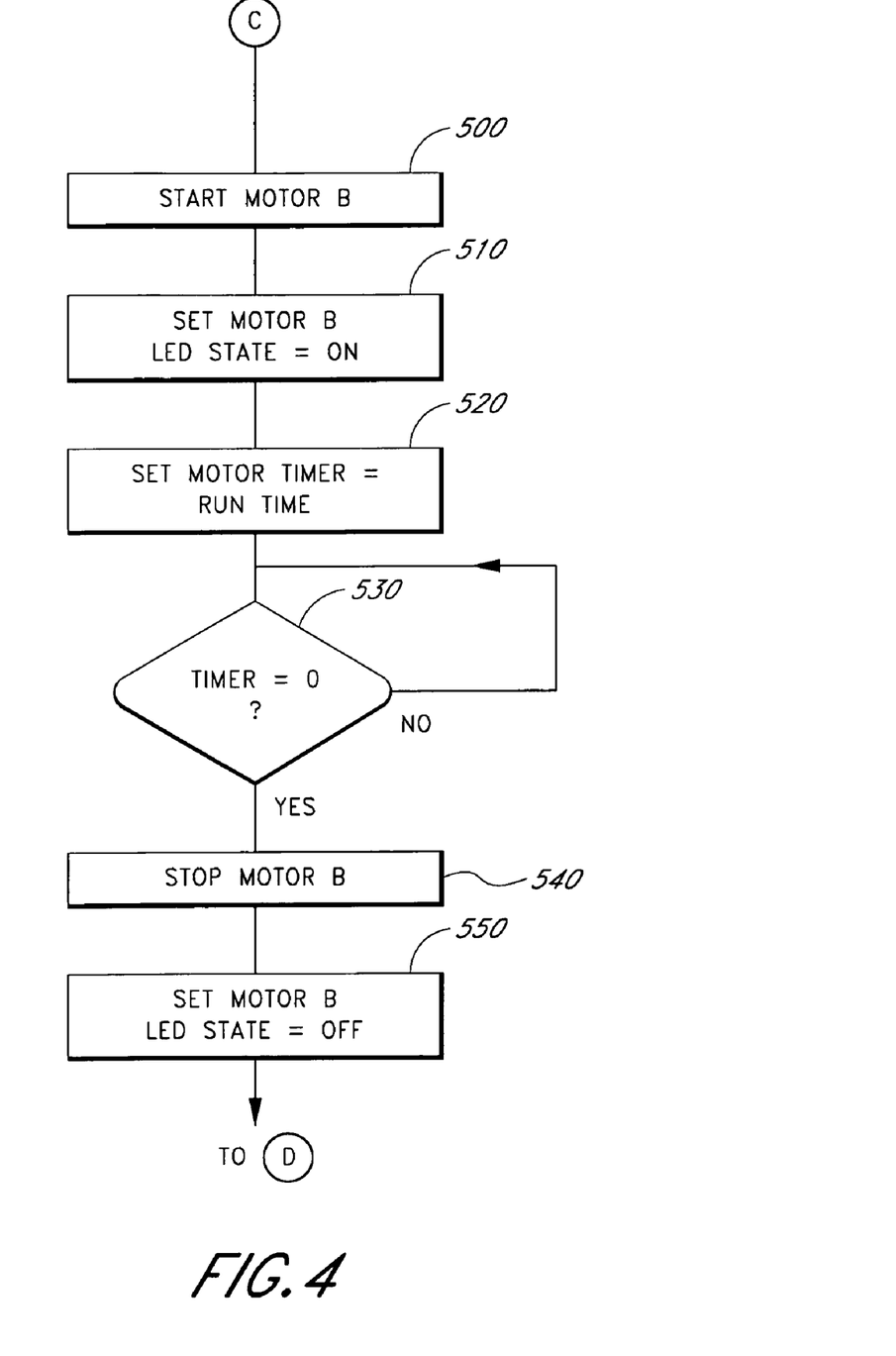

Referring now to FIG. 4, in operational block 500 the processor 120 sends a signal to a second motor driver 140 causing a second motor 145, corresponding to the "B" container, to actuate. In an exemplary embodiment, the second motor 145 actuates using the velocity parameter previously stored in the velocity register (see, for example, operational blocks 300, 310, 320, 330 in FIG. 2). In embodiments wherein the user interface 105 comprises a motor status indicator to indicate operation of the second motor 145, such indicator is activated in operational block 510. As described above, such a configuration advantageously provides the user with information relating to the status of the motors comprising the valve closing system 100.

After the motor status indicators are set appropriately, operation proceeds to operational block 520, wherein a motor timer is set to the value previously stored in a run time register (see, for example, operational blocks 300, 310, 320, 330 in FIG. 2). The second motor 145 is then allowed to run for such a predetermined period of time in decisional block 530. Specifically, if the motor timer contains a non-zero value, then the motor timer is polled again; if the motor timer equals zero, then operation proceeds to operational block 540. The motor timer is decremented by the interrupt operating routine, as described below. Such a configuration causes the second motor 145 to run for the predetermined time period.

After the second motor 145 has run for the predetermined time interval, in operational block 540 the processor 120 sends a signal to the second motor driver 140 causing the second motor 145 to stop operation. As described above, in embodiments wherein the user interface 105 comprises a motor status indicator to indicate operation of the second motor 145, such indicator is deactivated in operational block 550. Operation of the processor 120 will then proceed to operational point D, illustrated in FIG. 5.

Referring now to FIG. 5, after one or more of the motors 130, 145 are closed as described above, operation of the processor proceeds to decisional block 560, where the motor flag is again polled. If the motor flag is not set to "all", that is, if a "test valve close" was performed due to a user-initiated test command, then operation is paused briefly (for example, five seconds) in operational block 600, and operation returns to operational point A in FIG. 2.

However, if the motor flag is set to "all", that is, if an "emergency valve close" was performed due to an actuation signal generated by an external sensor 156 or by the battery monitoring circuitry 174, then the relay driver 160 is activated briefly (for example, three seconds) in operational block 570. Such activation of the relay driver 160 can be used, for example, to sound an alarm or to otherwise alert local or remote personnel that the closing system 100 has operated and closed the valves.

Referring still to FIG. 5, after the relay driver is briefly activated, the processor checks for the presence of a low battery flag in decisional block 580. If no low battery flag is detected, that is, if a the "emergency valve close" was performed due to an actuation signal received from an external sensor 156, then operation is paused briefly (for example, fifteen seconds) in operational block 590, and operation returns to operational point A in FIG. 2. However, if a low battery flag is detected, then the voltage across the battery is polled in decisional block 610. If such voltage does not exceed a preset minimum voltage required to perform an additional "emergency valve close", then program operation is paused until such minimum voltage exists across the battery (and, through the interrupt operating routine described below, an appropriate indicator is activated on the user interface 105). If the voltage across the battery exceeds the present minimum voltage required to perform an additional "emergency valve close", then program operation returns to operational point A in FIG. 2. In an exemplary embodiment, the minimum voltage is approximately 12.5 volts.

Interrupt operating routine. The interrupt operating routine is illustrated in the flowcharts of FIG. 6 and comprises operational blocks 700 through 790. As described above, the interrupt operating routine runs at a specified time interval (for example, every 10 milliseconds in one embodiment), interrupting the main operating routine at such intervals. After the interrupt operating routine is complete, the processor resumes execution of the main operating routine at the interruption point. In an exemplary embodiment, the interrupt routine executes in a fraction of the minimum time allotted to increase the interrupt repetition rate.

Referring now to FIG. 6, the interrupt operating routine begins when the value of an incrementing hardware timer in the processor 120 equals the value of an interrupt timer register. At such point, the value of the interrupt timer register is saved and hardware interrupts are disabled in an operational block 700. The indicator timers, an exemplary use of which is described above in connection with the Armed/Ready indicators (see operational block 230 in FIG. 2) are reduced in operational block 710 of the interrupt operating routine. The wait timers, which are used in connection with the firmware delays at operational blocks 590 and 600, are reduced in operational block 720 of the interrupt operating routine. The relay timers, which are used in connection with the relay driver 160 in operational block 570, are reduced in operational block 730 of the interrupt operating routine. The motor times, which are used in connection with decisional blocks 450 and 530, are reduced in operational block 740 of the interrupt operating routine.

After reducing appropriate timers, the interrupt operating routine proceeds to poll whether an actuation signal has been generated by an external sensor 156 or at the user interface 105 in an operational block 750. If such an actuation signal has been generated, an appropriate flag is set (emergency close flag or test close flag, respectively). Likewise, in operational block 760, the interrupt operating routine polls the battery 170 to see if a low battery condition exists; if so, a low battery flag is set. The status of the power supply 150 is polled in operational block 770, to determine, for example, whether the power supply 150 is charging the battery 170 in a fast charge mode, is charging the battery 170 in a slow charge mode, or is maintaining the battery charge, or cannot detect the presence of a battery 170. The status of the power supply and the voltage across the battery can be checked for consistency. Such battery charge status information and power supply status information can be used to update the user interface in operational block 230 of FIG. 2.

After checking for actuation signals and polling the status of the power supply 150, the interrupt operating routine can be programmed to update the status of any indicators on the user interface 105, such as a battery status indicator (fully charged, partially charged, or discharged) or a power supply status indicator (fast charge mode, slow charge mode, maintain charge mode, or no battery present). By updating such indicators in the interrupt operating routine, such indicators can be configured to flash at a desired frequency; in modified embodiments such indicators are updated during the main operating routine, such as in operational block 230 illustrated in FIG. 2.

Before the interrupt operating routine ends, the interrupt timer value is incremented by a value equal to the desired execution frequency of the interrupt operating routine in an operational block 790. For example, if the interrupt timer value is incremented by 10 ms, then in 10 ms the incrementing hardware timer will again equal the interrupt timer value, and the interrupt operating routine will execute again. After the interrupt operating routine has completed execution, operation of the processor 120 is returned to the point where the main operating routine was interrupted The operating procedures described herein can have one or more of the following example advantages. For example, an appropriate amount of torque can be delivered to the valve stem depending on whether an "emergency valve close" or a "test valve close" is performed. Thus, battery life can be preserved and system component wear can be reduced when performing a "test valve close" while still allowing system integrity to be checked. In particular, as illustrated in FIG. 2, when a "test valve close" is performed the drive motor runs for a shorter period of time and at a lower velocity than when an "emergency valve close" is performed. Stated more generally, using a programmable electric controller to drive the motors provides for control of the torque applied to the flow control valve stem, thereby providing secure and reliable valve closings.

The use of a ratcheting mechanism to apply torque to the valve stem, such as the impact wrench described above, allows the motors 130, 145 to continue to rotate as the flow control valve stem stops rotating and begins to seat. In particular, as the valve stem stops rotating, the ratchet mechanism coverts the motor velocity and torque to a force used to seat and tighten the flow control valve stem. This configuration provides a reliable and secure valve closing without applying excessive torque to the valve stem and risking damage to the valve mechanism.

In addition, the battery monitoring circuitry 174 allows the voltage across the battery 170 to be monitored, and can cause the valves to be closed before the battery 170 becomes completely discharged. This configuration ensures that if an emergency close condition exists, sufficient battery power will exist to close the valves completely and properly. Likewise, the presence of the relay driver 160 can be used to notify local or remote personnel that the valve close system 100 has operated and has closed the valve or valves under an "emergency valve close" condition.

CONCLUSION

Although exemplary embodiments of the invention have been described above, an ordinarily skilled artisan will appreciate that a number of variations and modifications exist. Such variations and modifications should be considered within the scope of the invention, as defined in the claims that follow.

We claim:

1. A method comprising:
   providing a programmable electronic controller configured to apply a predetermined power to a motor upon receiving a valve close signal;
   providing an impact torqueing device configured to translate a rotation produced by the motor into rotation of a pressurized gas storage container valve stem;
   mounting the impact torqueing device to a first portion of the valve stem, such that a second portion of the valve stem is accessible to a user for manual operation;
   providing a user interface capable of sending valve close signals to the programmable electric controller; and
   positioning a gas detector in a region of gas use, the gas detector configured to send a valve close signal to the programmable electric controller upon detection of a gas.

2. The method of claim 1, further comprising providing a power supply configured to provide power to the motor and the programmable electric controller.

3. The method of claim 2, wherein the power supply comprises a rechargeable battery.

4. The method of claim 3, wherein the power supply is configured to send a valve close signal to the programmable electric controller when the battery produces an electric current less than a threshold electric current.

5. The method of claim 1, further comprising providing a relay driver electrically connected to the programmable electric controller, such that an electric current is supplied to the relay driver when the programmable electric controller receives a valve close signal, and wherein the relay driver is electrically connected to an audible alarm.

6. The method of claim 1, further comprising providing a relay driver electrically connected to the programmable electric controller, such that an electric current is supplied to the relay driver when the programmable electric controller receives a valve close signal.

7. The method of claim 1, further comprising providing a dampener circuit configured to filter the valve control signal before such valve control signal is provided to the programmable electric controller.

8. A method of closing a pressurized storage tank valve comprising:
   providing a valve close signal to a controller in response to detection of a low battery condition in a power supply; and
   applying an actuation signal to a motor for a predetermined time upon receiving the valve close signal at the controller, thereby causing the pressurized storage tank valve to close.

9. The method of claim 8, further comprising energizing a relay driver upon detection of at least one of conditions (a) and (b), wherein the relay driver is electrically connected to the controller, and wherein the relay driver is electrically connected to an audible alarm.

10. The method of claim 8, further comprising energizing a relay driver upon detection of at least one of conditions (a) and (b), wherein the relay driver is electrically connected to the controller.

11. The method of claim 8, wherein the motor is mechanically coupled to an impact torqueing device.

12. A valve control system comprising:
   a programmable electronic controller configured to provide an emergency actuation signal to a motor upon receiving an emergency close signal, and a test actuation signal to the motor upon receiving a test close signal;
   a gas detection input configured to receive a gas detection signal, wherein receipt of the gas detection signal at least partially meeting a first criterion causes the emergency close signal to be supplied to the controller;
   a user interface configured to provide the controller with the test close signal in response to a user input; and
   a low battery input configured to receive a low battery signal, wherein receipt of the low battery signal causes the emergency close signal to be supplied to the controller.

13. The system of claim 12, wherein the user interface further comprises a plurality of visible indicators configured to indicate to the user one or more of a battery status state, a battery charger status state, and a motor ready status state.

14. The system of claim 12, further comprising a relay driver, wherein the programmable electronic controller provides an electric current to the relay driver upon receiving the emergency close signal, and wherein the relay driver is electrically connected to an audible alarm.

15. The system of claim 12, further comprising a relay driver, wherein the programmable electronic controller provides an electric current to the relay driver upon receiving the emergency close signal.

16. The system of claim 12, wherein the motor is mechanically coupled to a ratcheting mechanism.

17. The system of claim 16, wherein the ratcheting mechanism is mechanically coupled to a pressurized gas storage container valve stem.

18. The system of claim 17, wherein the ratcheting mechanism comprises an impact wrench.

19. The system of claim 12, further comprising a dampener circuit configured to filter signals received at the programmable electronic controller.

20. The system of claim 12, further comprising a power supply system configured to provide power to the programmable electric controller and the motor.

21. The system of claim 20, wherein the power supply system comprises a rechargeable battery.

22. A valve control system comprising:
- an impact torqueing device attached to a valve stem coupler, the valve stem coupler configured to be removably attached to a valve stem of a pressurized storage container;
- a motor configured to provide a driving torque to the impact torqueing device, such that the impact torqueing device transmits the driving torque to the valve stem of the pressurized storage container, thereby moving the valve stem from an open position to a seated position;
- a programmable electronic controller configured to provide an actuation signal to the motor upon receiving a close signal from an external source, such that the motor applies the driving torque to the impact torqueing device upon receipt of the actuation signal; and
- a power supply configured to provide electrical power to the motor and the programmable electronic controller.

23. The valve control system of claim 22, wherein the impact torqueing device is capable of rotation with respect to the valve stem when the valve stem is in the seated position.

24. The valve control system of claim 22, wherein the actuation signal comprises an electrical signal having a predetermined voltage and current selected to cause the motor to provide a driving torque sufficient to move the valve stem from the open position to the seated position.

25. The valve control system of claim 22, wherein the external source is a gas detection sensor configured to provide the close signal upon detection of a specified gas.

26. The valve control system of claim 22, wherein the external source is a user interface having one or more test switches configured to provide the close signal at a user's command.

27. The valve control system of claim 22, wherein the power supply further comprises a rechargeable battery.

28. The valve control system of claim 27, wherein the external source is a battery monitoring circuit configured to provide the close signal upon detection of a low battery condition.

29. The valve control system of claim 22, further comprising a relay driver, wherein the programmable electronic controller provides an electric current to the relay driver upon receiving the close signal.

30. The valve control system of claim 29, wherein the relay driver is electrically connected to an audible alarm.

* * * * *